United States Patent [19]

Pomerleau

[11] Patent Number: 5,161,368
[45] Date of Patent: Nov. 10, 1992

[54] STATIONARY REACTOR AND ROTARY MOTOR

[76] Inventor: Alphonse Pomerleau, 59, 14th Ave. South, Sherbrooke, Québec, Canada, J1G 2W5

[21] Appl. No.: 703,199

[22] Filed: May 20, 1991

[51] Int. Cl.$^5$ .................... F02C 3/00; F02C 5/00
[52] U.S. Cl. .................... 60/39.75; 60/39.34; 60/39.35; 60/39.36; 415/80
[58] Field of Search ............ 60/39.75, 39.34, 39.35, 60/39.36; 415/80; 416/20 R

[56] References Cited

U.S. PATENT DOCUMENTS

| | | | |
|---|---|---|---|
| 1,152,045 | 8/1915 | Reeves | 60/39.34 |
| 1,887,001 | 11/1932 | Zetterberg | 60/39.35 |
| 2,439,717 | 4/1948 | Cooke | 60/39.34 |
| 2,599,209 | 6/1952 | Tenney et al. | 60/39.34 |
| 2,612,955 | 10/1952 | Tenney et al. | 60/39.34 |
| 3,200,588 | 8/1965 | Math | 60/39.35 |
| 3,611,720 | 10/1971 | Fehlau | 60/39.36 |
| 4,024,705 | 5/1977 | Hedrick | 60/39.35 |
| 4,741,154 | 5/1988 | Eidelman | 415/80 |

Primary Examiner—Richard A. Bertsch
Assistant Examiner—Howard R. Richman
Attorney, Agent, or Firm—McGlew & Tuttle

[57] ABSTRACT

A stationary reactor is provided having a disc-shaped combustor having a top plate and a bottom plate spaced apart from each other. The space between the plates defines a combustion chamber having a center and a periphery, the space tapers at the periphery of the chamber. Ignition is provided centrally located in the chamber. An air intake supplies an explosive mixture to the chamber which ignites to cause expansion. The combustion chamber has a peripheral aperture defined by the space between of each of the plates at the periphery of the chamber, the aperture allows the expanded mixture to be discharged from the chamber in a substantially circumferential manner.

12 Claims, 7 Drawing Sheets

STATIONARY REACTOR AND ROTARY MOTOR

BACKGROUND OF THE INVENTION a) Field of the invention

The present invention relates to a stationary reactor having a central combustion chamber and no moving parts. More particularly, the invention relates to a rotary motor comprising such a reactor and a fan blade cage enclosing the reactor to provide rotary power.

b) Description of the prior art

Different rotary engines having a central combustion chamber are described in U.S. Pat. Nos.: 1,152,045; 2,439,717; 2,599,209; and 4,741,154. Each of these engines comprises a combustion chamber that is rotatable around a central axis, and consequently require a plurality of swivel connections in order to connect the nonrotatable elements (such as the combustible inlet means, the spark plugs, etc..) to the rotatable combustion chamber. Moreover, the combustion chamber being usually one of the heaviest element of the combination, a greater energy is required to put it into motion and to keep the chamber in a rotary motion. Indeed, in order to enhance their rotation movement, all these engines possess means such as a stationary outward fan blade cage or nozzles to direct the outward flow. Also, rotary engines comprise multiple moving parts, and are thus subjected to wear and tear.

It has surprisingly been found, and this is the object of the present invention that the use of a stationary reactor obviates the above-mentionned disadvantages. The reactor of the invention may be used by itself as a propulsion system, or may be combined with a rotary fan blade cage, such a blade cage being set in motion by the air propulsed from the reactor, thereby inducing a rotary motion to a coxial axle provided therewith.

SUMMARY OF THE INVENTION

Accordingly, the present invention provides a stationary reactor comprising a disk shaped shaft having a top plate and a bottom plate space apart from each other, the space between the plates defining a combustion chamber having a center and a periphery, and ignition means centrally located in the chamber, the ignition means supplying an explosive mixture to the chamber and igniting the explosive mixture to cause expansion thereof, the combustion chamber having a peripheral aperture defined by the space between the plates at the periphery of the chamber, this aperture allowing the expanded mixture to be discharged from the chamber in a substantially circumferential manner.

The invention also provides for a combustion motor which comprises the above-defined reactor enclosed by a rotary fan blade cage peripheral of the reactor, the cage comprising an annular plurality of pockets made of from obliquely set blades, these pockets receiving discharged expanded mixture from the aperture, thereby driving the cage in a rotational motion, the fan blade cage being connected to an axle co-axial with the reactor and from which the rotational motion of the cage is transformed in power.

The invention will be described for purposes of illustration only in connection with certain embodiments; however, it is recognized that those persons skilled in the art may make various changes, modifications, improvements and addition on the illustrated embodiments, all without departing from the spirit and scope of the invention.

DESCRIPTION OF PREFERRED EMBODIMENTS

Figure 1:
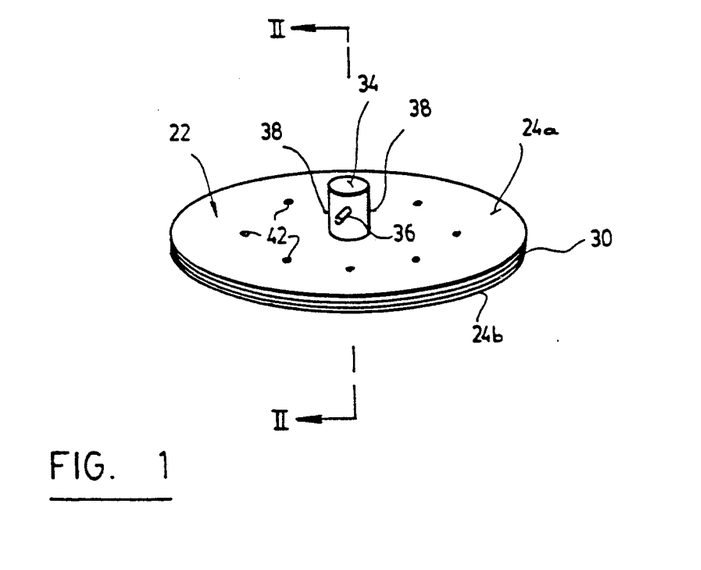
FIG. 1 is a perspective view of a reactor according to the invention.

As shown in FIG. 1, the air intake 34 may be in the form of a cylinder located centrally on the upper plate 24a and to which are connected the combustible inlet 36 and the electrodes 38. There is shown only one row of bolts 42, but it will be well understood that additional rows can be added depending on the power of the reactor. Of course, the number of bolts and their disposition should be optimal to maintain both plates well secured together, however, this number should be limited by the fact that the outward air flow should not be hindered or deflected to a significant degree by these bolts.

Figure 2A:
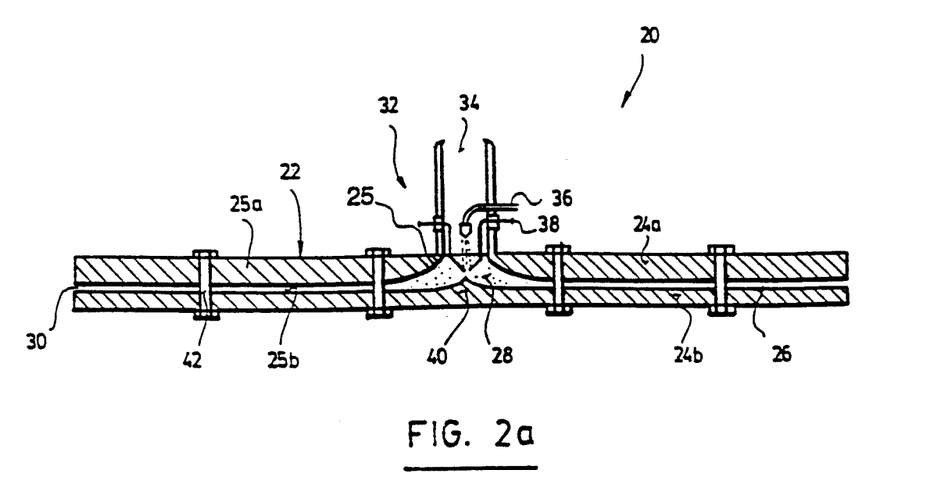
FIG. 2a is a cross-section view of the reactor of the invention taken along line II—II of FIG. 1.

FIG. 2a shows a reactor 20 according to the invention which comprises a disc-shaped hollow shaft 22 having a top plate 24a and a bottom plate 24b spaced apart from each other by a given distance 26. The space defined by the distance 26 separating the two plates 24a and 24b defines a combustion chamber 28. This space is greater at the center of the combustion chamber 28 and tapers gradually towards its periphery 30. The reactor 20 also includes ignition means 32 that consist of an air-intake 34, into which are disposed an combustible inlet 36 and at least one electrode 38 or spark plug. This ignition means is centrally located into one of the two plates (in occurence 24a) of the disc-shaped shaft 22, the opposed plate 24b being provided with a pin 40 extending inwardly of the combustion chamber and facing directly opposite to the ignition means 32 in order to direct the incoming explosive mixture (combustible and air) and the expanding mixture (once it is ignited) outwardly from the center of the chamber 28. The two plates 24a and 24b of the shaft 22 are connected together and held at a given distance by a plurality of bolts 42 disposed at a given radial distance from the center of the combustion chamber 28. The electrodes should be ignited deep enough into the combustion chamber such that the explosion takes place lower than the level of the inner surface 25 of the upper plate 24a. Of course, because the suction caused by the expanding mixture, no mechanical means are required to inject air as the same is drawn in naturally from outside through the air intake 34.

It will be appreciated that the air inlet does not comprise a valve to prevent the explosion from exiting upwardly. The exponentially decreasing curve of the combustion chamber drives the explosion towards the sides of the chamber in a uniform manner without provoking any reflux at the air inlet 34. However, it may still be possible to add a diaphragm-type valve to the air inlet 34, to provide a quantity of air adjustable to the quantity of combustible injected in the combustion chamber.

In addition, it is possible to provide an air compressor to the air inlet in order to inject air continously at a high pressure. In this manner, a continous flow of combustible may be injected in the combustion chamber, thereby providing a continous explosion in the combustion chamber.

Figure 2B:
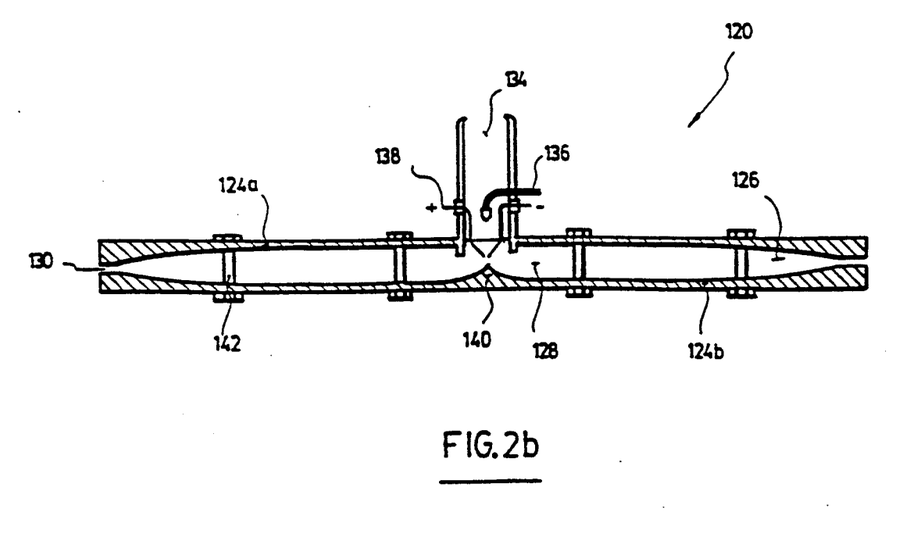
FIG. 2b is a cross-section view of another embodiment of the reactor of the invention.

To provide tapering of the combustion chamber, at least one plate 24a or 24b of the hollow shaft 22 must have at least one portion of its inner surface 25a or 25b tapered in such a manner that the distance separating the two plates diminishes with increasing radius. FIG. 2b illustrates another embodiment of the reactor when the two plates are tapered similarly, with a rapid drop in space near the periphery of the combustion chamber.

Alternatively, as represented in FIG. 2a, the inner surface 25a of the upper plate 24a may taper gradually towards the periphery, whereas the lower plate 24b does not taper. Preferably, the distance between the two plates should decrease exponentially from the center of the plate toward its periphery, in such a way that the expanded gases are compressed more rapidly by the tapering of the combustion chamber than by their own cooling. As shown in FIG. 2a, by way of example, the upper plate 24a tapers exponentially with increasing radius whereas the lower plate 24b is planar and does not change in thickness.

Such a reactor can produce a large amount of expanded air in a short period of time, the outward pressure being adaptable for a multitude of uses.

Figure 3:
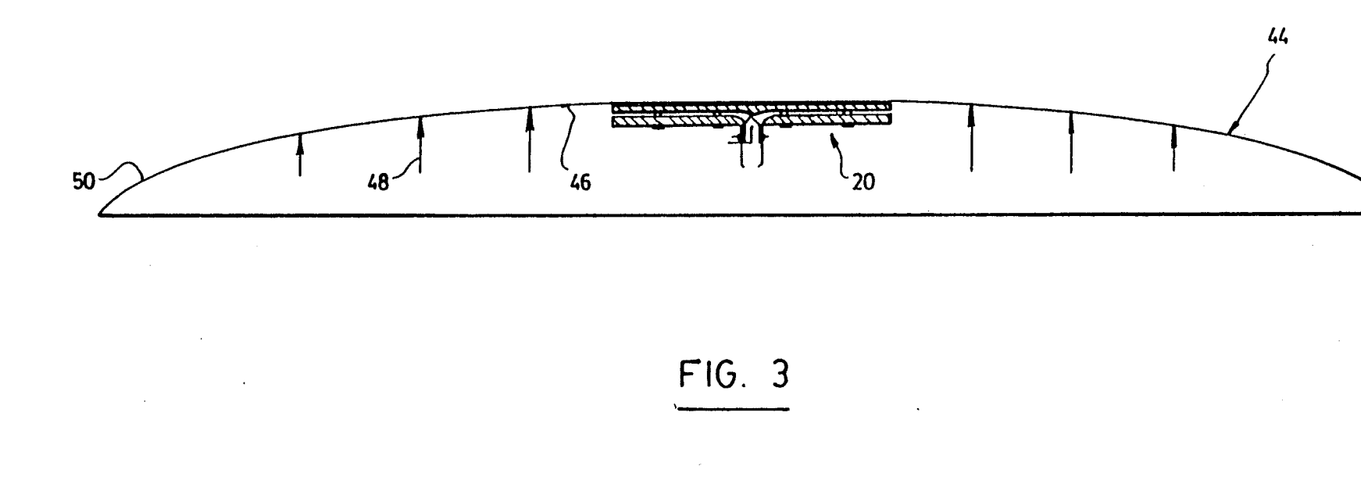
FIG. 3 is a cross-section view of a curved dome comprising the reactor of the invention.

As a first preferred example of use, the reactor may be disposed underneath a curved dome under which the air pressure causes an upward movement and lifts of the dome. As represented in FIG. 3, when this circumferential reactor is disposed underneath a convex dome 44, the air flow discharged circumferentially from the reactor hit the undersurface 46 of the dome thereby provoking an upward movement 48. This dome 44 may be attached by any known manner to a cabin or the like constituting a fulcrum to stabilize the assembly. Preferably, the curve of the dome should follow an exponential path decreasing more as it tends towards its periphery 50.

Alternatively, as a second preferred example of the use of such a reactor, it may be employed for actuating a rotary motor. On FIG. 4, there is shown the reactor of FIG. 2a when enclosed in an outward fan blade cage 52 comprising an annular plurality of pockets 54 made up from obliquely set blades 56. Of course, in order to create a rotary motion 57, the air flow must enter the pocket 54 from the inwardly facing end 58, be deflected upon hitting the concave side of the pocket 60, and then exit at the outer end of the pocket 62. Each pocket 54 is closed on both its top 53 and bottom 55 sides by an annular plate 59 and 61. The lower plate 61, however, may be a disc connected in its center to an axle 63. The power generated by the rotation of the axle may be transmitted to any desired point as is known by any person skilled in this domain.

Figure 4:
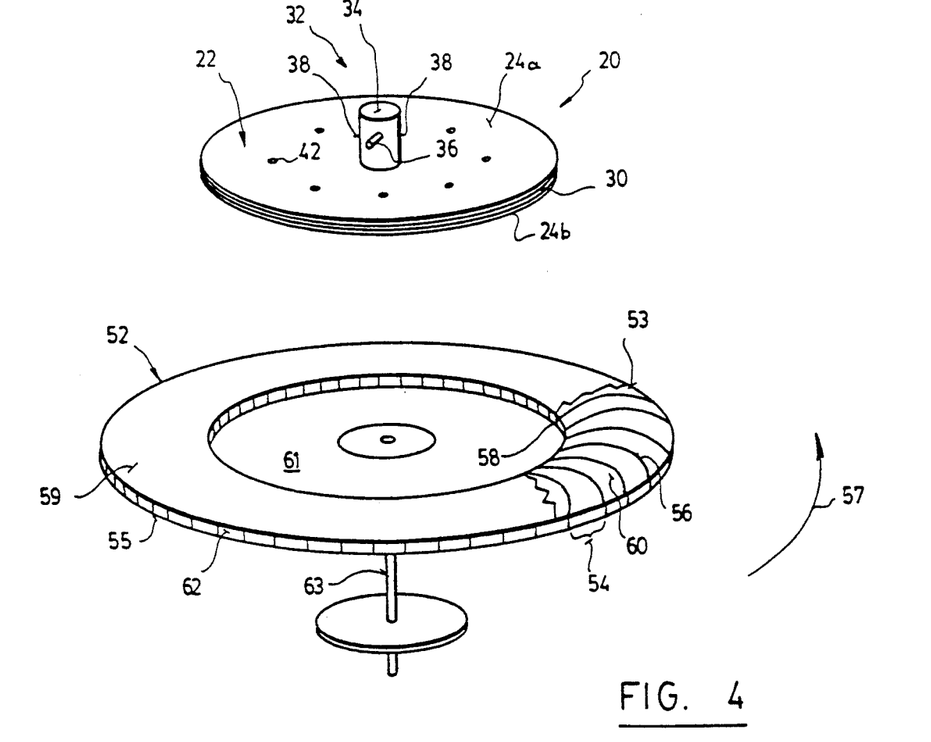
FIG. 4 is an exploded view of the assembly of the reactor shown in FIG. 1 and of a fan blade cage to form a rotary motor according to the invention.

If the lower plate 61 is also annular, it may be connected to the axle 63 by a plurality of equally spaced shafts. However, it is preferable to provide a full plate in order to avoid friction of the shafts when in rotation.

As will be assessed by a person skilled in this domain, the angle of deflection of the blades 56 may vary depending on the performance desired.

Figure 5:
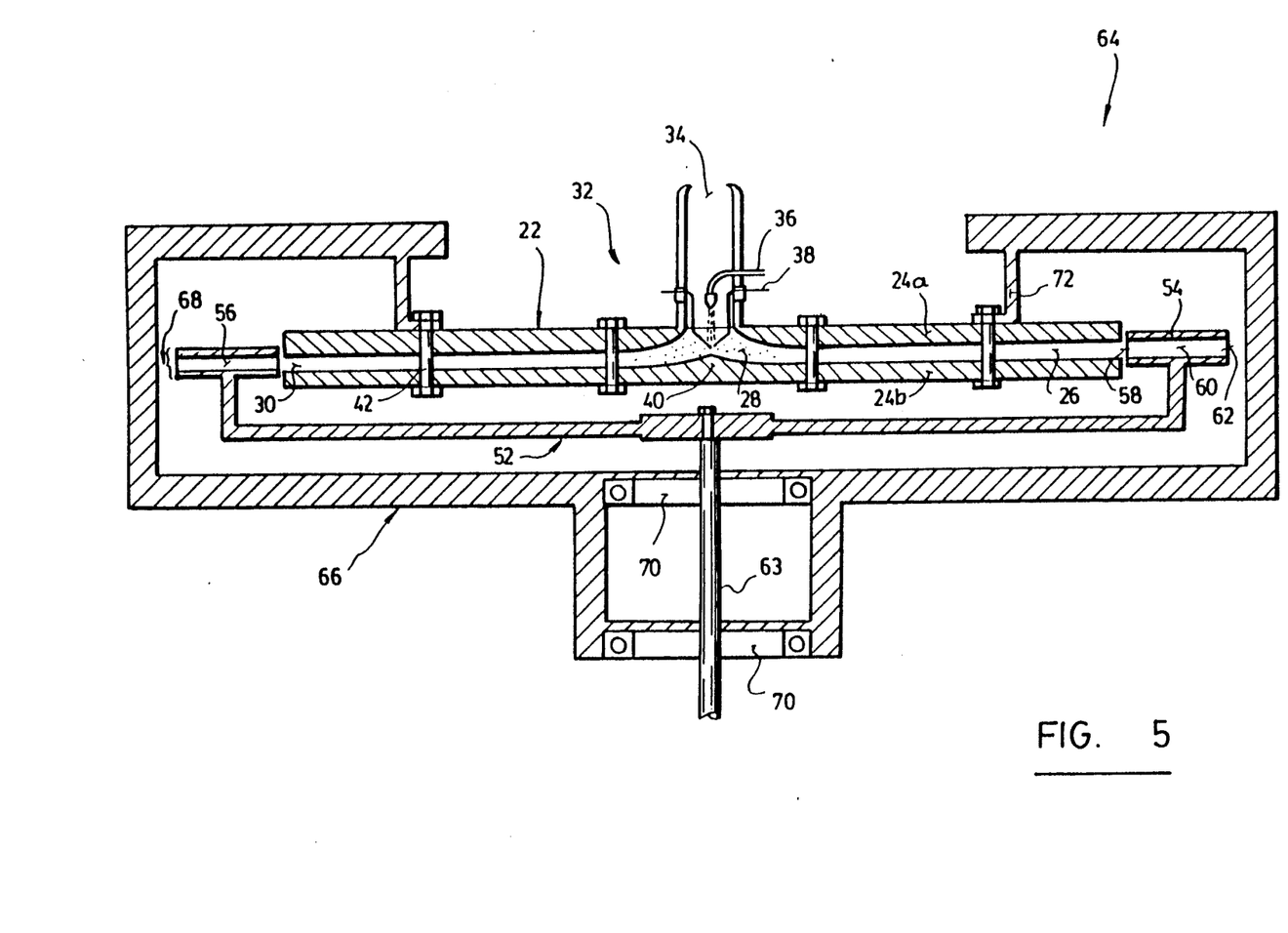
FIG. 5 is a cross-section view of the rotary motor of the invention.

FIG. 5 shows the motor 64 when installed in a housing 66. The housing 66 is circular, and encloses but does not touch the fan blade cage 52 which itself encloses the reactor 20 without touching it. In this manner, the fan blade cage 52 is connected to a minimum of parts and is easy to set in motion. The cage 52 is set as closely as possible from the periphery 30 of the reactor 20 so that as little air as possible is lost from the explosion. However, the tolerance between the cage and the reactor should be carefully chosen taking into account the expansion of metal caused by heat. Also, the width of each pocket 68 should preferably correspond to the distance separating the two plates 24a and 24b of the hollow shaft 22 such that the air flow is utilized optimally to be deflected against the blades 56. The reactor is secured inside the housing by a plurality of hooks 72 which are bolted on one side to the housing 66, and on the other side through both plates 24a and 24b of the hollow shaft 22. On the other hand, the axle 63 is secured to the housing by resting on a set of bearings 70 to allow its rotation and maintain stability in rotation.

As will be appreciated from FIG. 5, the only moving parts provided in this rotary motor are the cage 52, and the axle 63, whereas the only parts subjected to wear and tear will be the bearings 70 on which the axle 63 rests.

Figure 6:
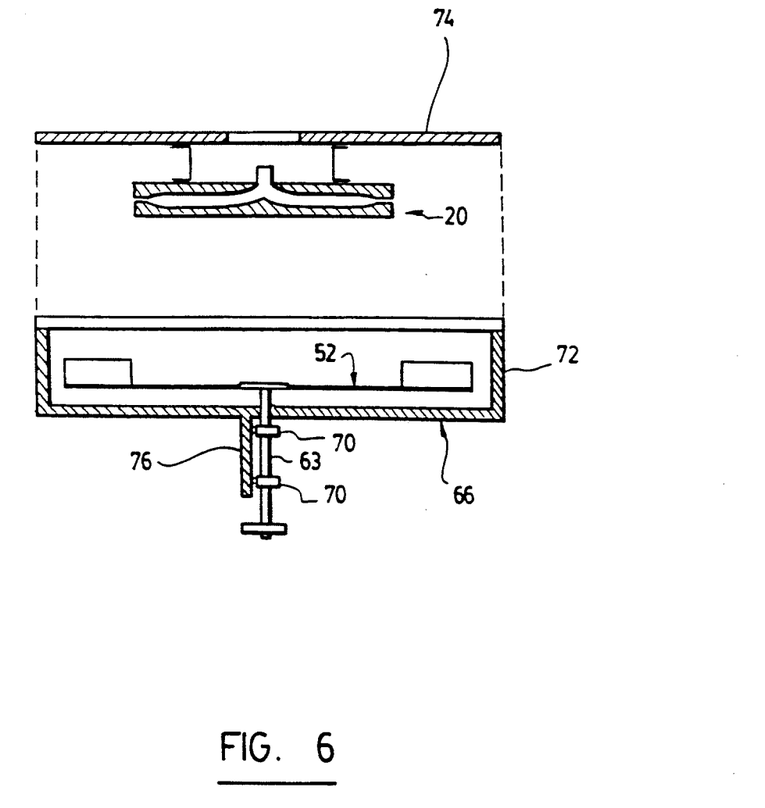
FIG. 6 is a cross-section view of the assembly of the rotary motor inserted in a housing.

Shown in FIG. 6 is an exploded diagram of one manner of assembling the motor in the housing 66. For the sake of simplicity, the housing 66 comprises two main parts, a housing member 72 and a cover member 74. The fan blade cage 52 is secured to the housing member 72 through its axle 63 which rests on the bearings 70 secured by a vertical plate 76. Once the cage and axle are well centered, the reactor 20 secured to the cover member 74 is inserted at the center of the cage 52 and the cover member 74 rests on the housing member 72. Both members are bolted together so that they may be removed for reparation and maintenance.

Figure 7:
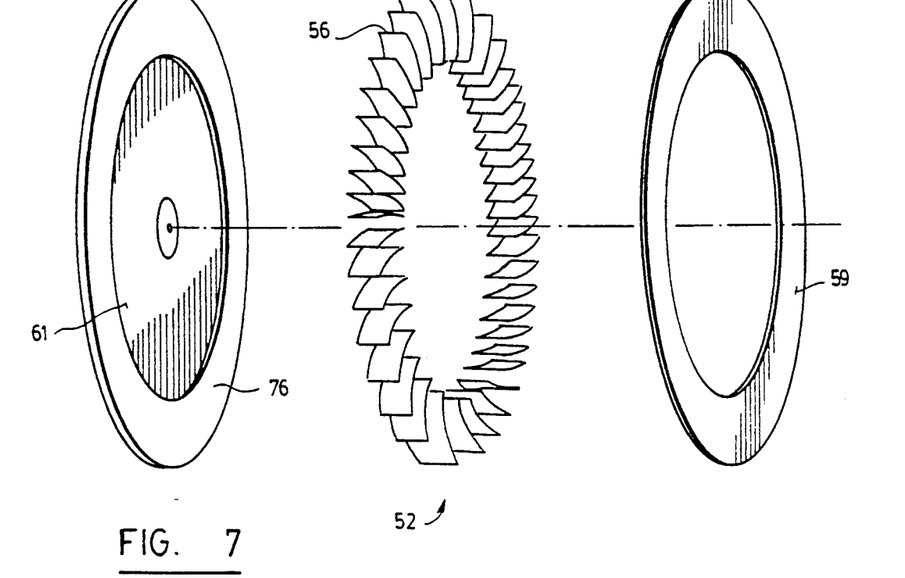
FIG. 7 is an exploded view of the structure of the fan blade cage.

FIG. 7 represents one way of making the fan blade cage 52 by welding each blade 56 on the disc-shaped plate 61, and then welding the annular top plate on the plurality of blades. The disc-shaped plate 61 may comprise an annular rim 76 slightly elevated to provide a platform for the blades 56 such that the opening of the pocket 58 thus formed is at the same height as the peripheral aperture 30 of the reactor 22 once the reactor is inserted inside the cage 52.

Figure 8A:
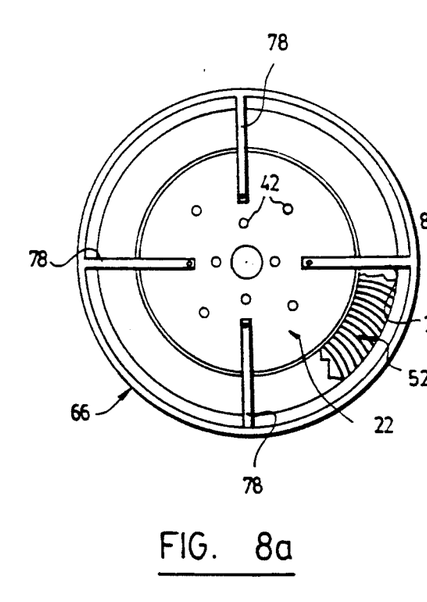
FIG. 8a is a top plan view of the rotary motor of the invention.
Figure 8B:
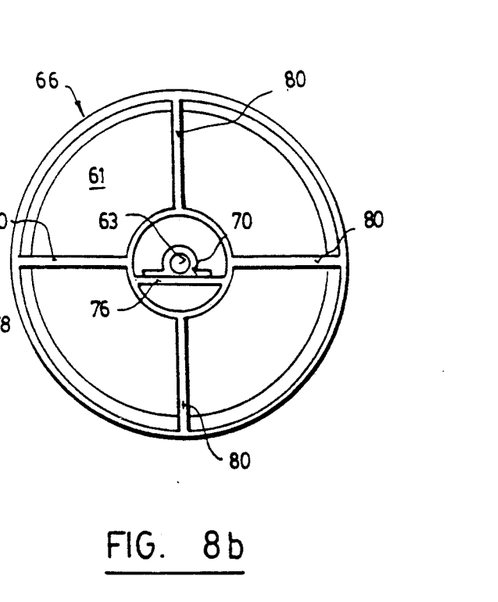
FIG. 8b is a bottom plan view of the rotary motor of the invention.
Figure 9:
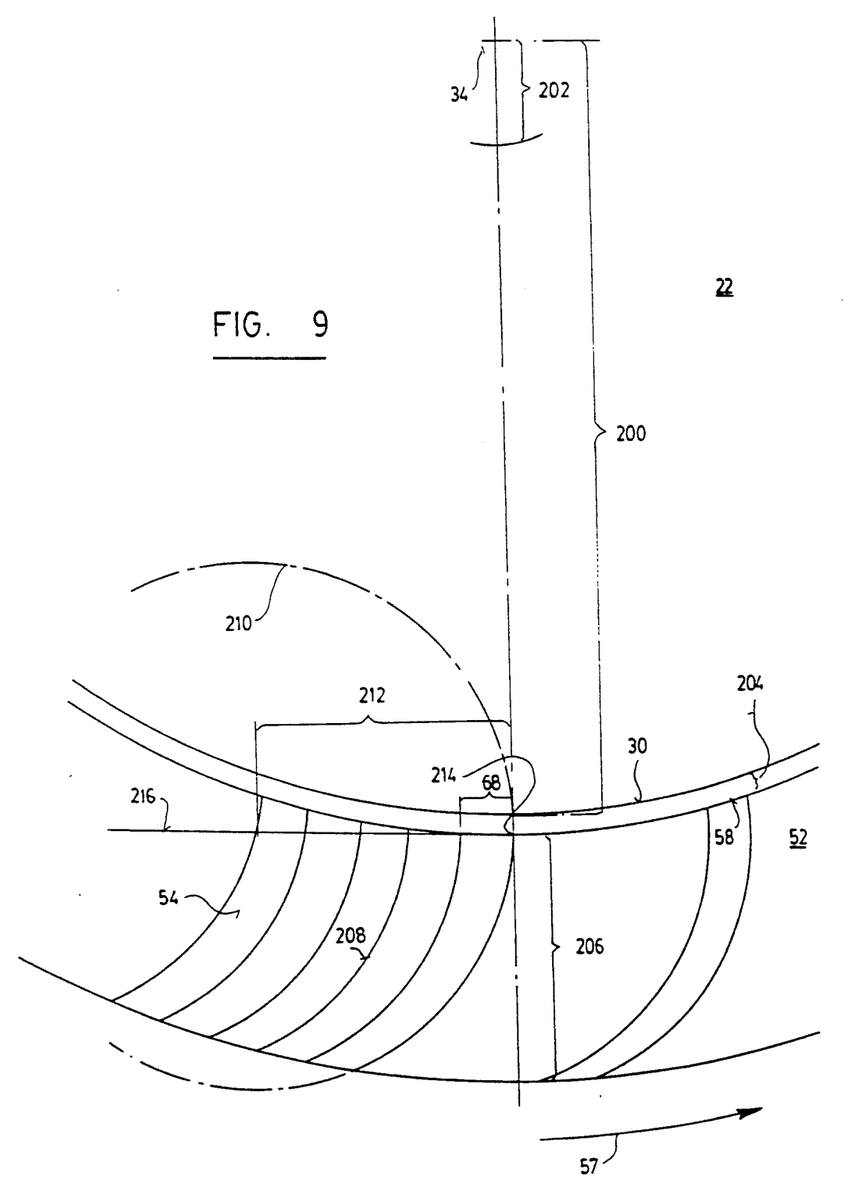
FIG. 9 is a diagram of one example of the tolerance distances in a rotary motor of the invention.

FIG. 8a shows a top plan view of the assembled motor showing that the cover member of the housing 74 may also be consituted by a plurality of equally spaced shafts 78 connected to the reactor 22 through the bolts 42. FIG. 9 shows the bottom plan view of the assembled motor where it is shown that the bottom of the housing member need not be "full". The bottom of the housing member may also be constituted by a plurality of equally spaced shafts 80 connecting at the center to a bearings 70 which are secured to the vertical plate 76.

The motor of this assembly can be supplied by a plurality of punctuated charges of combustible fed through the nozzle, mixed with the incoming air, and immediately ignited by the electrodes. The explosive mixture is therefore ignited, expands in the combustion chamber and is discharged through the peripheral exit into the rotary cage. It will be understood that the charges are successively exploded at a rapid rate in order to form a continuous pressure flow, and smooth rotation of the cage. Any suitable combustible may be used, such as gas, diesel, propane, etc.. The provision of ignition means (electrodes or spark plugs) will be according to the combustible chosen for the reactor, as will be known by a person in this domain.

EXAMPLE 1

FIG. 9 shows one example of the tolerances for one embodiment of the motor of the invention as described in the following:

radius 200 of the disc-shaped hollow shaft 22: 7.5 inches;
radius 202 of the air intake means 34: 1 inch;
width of the pockets 68 (distance between each blade): approximately 0.25 inch;
space 204 between the periphery of the reactor 30 and the inwardly facing end of the pockets 58: approx 1/16 inch or the closest without rubbing on each other depending on the metal used;
depth 206 of the pockets 56: approx 3 inches;
curvature of each blade 208: curvature of a circle 210 of approximately 5.2 inches in diameter 212 when measured from the point of connection 214 of the start of the blade and the tangent 216 of the inner circonference of the blade cage (see FIG. 9);
the space between the two plates of the hollow shaft at the periphery is approximately 0.250 inch (not shown) and the decrease in distance from the center is disclosed in Table 1:

TABLE 1

| Radius (in inches) | distance separating the two plates (in inch) |
| --- | --- |
| 1.00 | 0.68333 |
| 1.25 | 0.58333 |
| 1.50 | 0.51666 |
| 1.75 | 0.46904 |
| 2.00 | 0.43333 |
| 2.25 | 0.40555 |
| 2.50 | 0.38333 |
| 2.75 | 0.36515 |
| 3.00 | 0.34999 |
| 3.25 | 0.33718 |
| 3.50 | 0.32619 |
| 3.75 | 0.31666 |
| 4.00 | 0.30833 |
| 4.25 | 0.30098 |
| 4.50 | 0.29444 |
| 4.75 | 0.28859 |
| 5.00 | 0.28333 |
| 5.25 | 0.27857 |
| 5.50 | 0.27424 |
| 5.75 | 0.27029 |
| 6.00 | 0.26666 |
| 6.25 | 0.26333 |
| 6.50 | 0.26025 |
| 6.75 | 0.25741 |
| 7.00 | 0.25476 |
| 7.25 | 0.25229 |
| 7.50 | 0.25000 |

What is claimed is:

1. A stationary reactor comprising:
   a disc-shaped combustor having a top plate and a bottom plate spaced apart from each other, the space between said plates defining a combustion chamber having a center and a periphery, said space tapering at the periphery of said chamber, and
   ignition means centrally located in said chamber, said means supplying an explosive mixture to said chamber and igniting said explosive mixture to cause expansion thereof,
   said combustion chamber having a peripheral aperture defined by the space between said plates at the periphery of said chamber, said aperture allowing the expending mixture to be discharged from said chamber in a substantially circumferential manner.

2. A reactor as claimed in claim 1, wherein the space separating said top plate and bottom plate gradually tapers from the center to the periphery of said chamber.

3. A reactor as claimed in claim 1, wherein said ignition means comprise a central opening in one of said top plate or bottom plate, a distributing nozzle located in said opening for supplying an explosive mixture to said chamber, and electrodes for igniting said explosive mixture.

4. A reactor as claimed in claim 2, wherein said ignition means comprise a central opening in one of said top plate or bottom plate, a distributing nozzle located in said opening for supplying an explosive mixture to said chamber, and electrodes for igniting said explosive mixture.

5. A reactor as claimed in 3 further comprising a pin located at the center of the plate opposed to said opening, said pin directing said expanding mixture outwardly from the center of said chamber.

6. A reactor as claimed in 4 further comprising a pin located at the center of the plate opposed to said opening, said pin directing said expanding mixture outwardly from the center of said chamber.

7. A reactor as claimed in claim 1, wherein said top and bottom plates are held together at a given radial distance from the center of said chamber by a plurality of bolts.

8. A reactor as claimed in claim 2, wherein said top and bottom plates are held together at a given radial distance from the center of said chamber by a plurality of bolts.

9. A combustion motor which comprises:
   a reactor as defined in claim 5, and
   a rotary fan blade cage peripheral of said reactor, said cage comprising an annular series of inwardly opening pockets made up from obliquely set blades, said pockets receiving discharged expanded explosive mixture from said aperture thereby setting said cage in a rotational motion,
   said fan blade cage being connected to an axle coaxial with said reactor and from which the rotational motion of said cage is transformed in power.

10. A combustion motor which comprises:
    a reactor as defined in claim 6, and
    a rotary fan blade cage peripheral of said reactor, said cage comprising an annular series of inwardly opening pockets made up from obliquely set blades, said pockets receiving discharged expanded explosive mixture from said aperture thereby setting said cage in a rotational motion,
    said fan blade cage being connected to an axle coaxial with said reactor and from which the rotational motion of said cage is transformed into power.

11. A motor as claimed in claim 9, wherein each of said pocket is of a width substantially equal to the distance separating said top and bottom plates.

12. A motor as claimed in claim 10, wherein each of said pocket is of a width substantially equal to the distance separating said top and bottom plates.

* * * * *